United States Patent
Okazaki et al.

(10) Patent No.: US 10,439,520 B2
(45) Date of Patent: Oct. 8, 2019

(54) MOTOR STOP CONTROL METHOD AND MOTOR STOP CONTROL APPARATUS

(71) Applicants: Nidec Corporation, Minami-ku, Kyoto (JP); Nidec Copal Corporation, Tokyo (JP)

(72) Inventors: Osamu Okazaki, Kyoto (JP); Yuji Tanaka, Ueda (JP)

(73) Assignees: NIDEC CORPORATION, Kyoto (JP); NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 15/873,007

(22) Filed: Jan. 17, 2018

(65) Prior Publication Data

US 2018/0212539 A1 Jul. 26, 2018

(30) Foreign Application Priority Data

Jan. 20, 2017 (JP) ................................. 2017-008498

(51) Int. Cl.
   - H02P 3/06 (2006.01)
   - G05B 19/042 (2006.01)
   - H02P 6/17 (2016.01)
   - H02P 23/20 (2016.01)

(52) U.S. Cl.
   CPC .............. *H02P 3/06* (2013.01); *G05B 19/042* (2013.01); *H02P 6/17* (2016.02); *H02P 23/20* (2016.02)

(58) Field of Classification Search
   CPC .... H02P 3/06; H02P 6/17; H02P 15/00; H02P 21/36; H02P 23/20; H02P 6/24; H02P 8/24; G05B 19/042; G05B 19/231
   See application file for complete search history.

(56) References Cited

U.S. PATENT DOCUMENTS

| | | | | |
|---|---|---|---|---|
| 7,129,664 B2 * | 10/2006 | Kubo | ................ | B25J 9/1664 |
| | | | | 318/567 |
| 2005/0082999 A1 * | 4/2005 | Ether | ................ | B60T 8/1703 |
| | | | | 318/362 |
| 2012/0251213 A1 * | 10/2012 | Iesaki | ................ | G03G 15/5004 |
| | | | | 399/381 |
| 2013/0070013 A1 * | 3/2013 | Iesaki | ................ | B41J 29/38 |
| | | | | 347/16 |

FOREIGN PATENT DOCUMENTS

| | | |
|---|---|---|
| JP | 7-93832 B2 | 10/1995 |
| JP | 2001-245485 A | 9/2001 |
| JP | 2002-165471 A | 6/2002 |
| JP | 4212414 B2 | 1/2009 |

* cited by examiner

*Primary Examiner* — Bickey Dhakal
*Assistant Examiner* — Said Bouziane
(74) *Attorney, Agent, or Firm* — Keating & Bennett, LLP

(57) ABSTRACT

According to an aspect of the invention, a motor stop control method of a motor stop control apparatus which includes an arithmetic control unit and a detection unit. The arithmetic control unit has a stop start position at which a stop control is started from a position which is a predetermined angle before a target position at which a motor stops. The arithmetic control unit calculates a rotational speed of the motor at the stop start position on the basis of a detection value of the detection unit, and a stop time at which the rotational speed of the motor reaches zero from the stop start position on the basis of a deceleration line indicating a change in the rotational speed of the motor, the rotational speed of the motor, and the predetermined angle.

7 Claims, 5 Drawing Sheets

MOTOR STOP CONTROL METHOD AND MOTOR STOP CONTROL APPARATUS

CROSS-REFERENCE TO RELATED APPLICATION

This application claims the benefit of Japanese Patent Application No. 2017-8498 filed on Jan. 20, 2017, which is hereby incorporated by reference herein in its entirety.

BACKGROUND OF THE INVENTION

Field of the Invention

The present invention relates to a motor stop control method and a motor stop control apparatus.

Description of the Related Art

As a method for stopping a motor at a target position, for example, Japanese Patent 4212414 includes a speed control method in which a target speed value of a motor is determined as a control target value and a difference between a current speed of the motor and the control target value is made zero.

In the motor stop control method disclosed in Japanese Patent 4212414, a target speed value calculated in advance for each sampling interval from start to stop of the stop control performed on the motor is stored in a memory. Moreover, an arithmetic control unit configured to control an operation of the motor calculates a difference between the current speed of the motor detected by a speed detection unit for each sampling interval and the target speed value stored in the memory and calculates an amount of control which is proportional to such a difference through proportional control. In addition, the arithmetic control unit causes the current speed of the motor to follow the target speed value on the basis of such an amount of control.

In the motor stop control method disclosed in Japanese Patent 4212414, a speed and an angular velocity of the motor is detected for each sampling interval and a control target value obtained by adding an offset value based on the target speed value or the current speed and angular velocity to a control value calculated on the basis of a difference between the detected speed and angular velocity and a target speed value of an object to be controlled stored in advance is calculated. Moreover, the motor is subjected to stop control using such a control target value. In this case, when the current speed of the motor does not satisfy the target speed value at the stop start stored in advance (recorded in a profile), the behavior thereof is likely not to be stable in some cases.

SUMMARY OF THE INVENTION

The present invention provides a motor stop control method and a motor stop control apparatus that prevent a motor from overrunning a target stop position and can stably stop the motor at a target position.

An exemplary first invention of the present application is a motor stop control method of a motor stop control apparatus including an arithmetic control unit configured to control a motor and a detection unit capable of detecting a rotational state of the motor, the motor stop control method including: a rotational speed calculation step of calculating, by the arithmetic control unit, a rotational speed of the motor at a stop start position at which stop control is started from a position which is a predetermined angle before a target position at which the motor stops from a detection value detected by the detection unit; a stop time calculation step of calculating, by the arithmetic control unit, a stop time until the rotational speed of the motor reaches zero from the stop start position on the basis of a deceleration line indicating a change in the rotational speed of the motor, the rotational speed, and the predetermined angle; a rotational speed target value calculation step of calculating, by the arithmetic control unit, a rotational speed target value of the motor every time the control cycle elapses from a control cycle used to control the rotational speed, the stop time, and the motor; a deceleration section calculation step of calculating, by the arithmetic control unit, a deceleration section of the motor by multiplying the calculated rotational speed target value by the control cycle; a temporary target position calculation step of calculating, by the arithmetic control unit, a temporary target position from a sum of the deceleration section and the stop start position; a drive command calculation step of determining, by the arithmetic control unit, a current position of the motor from the detection value detected by the detection unit using the temporary target position as a control target value and calculating a drive command using a difference between the current position of the motor and the control target value; and an instruction step of outputting, by the arithmetic control unit, the drive command to the motor.

DESCRIPTION OF THE EMBODIMENTS

Figure 1:
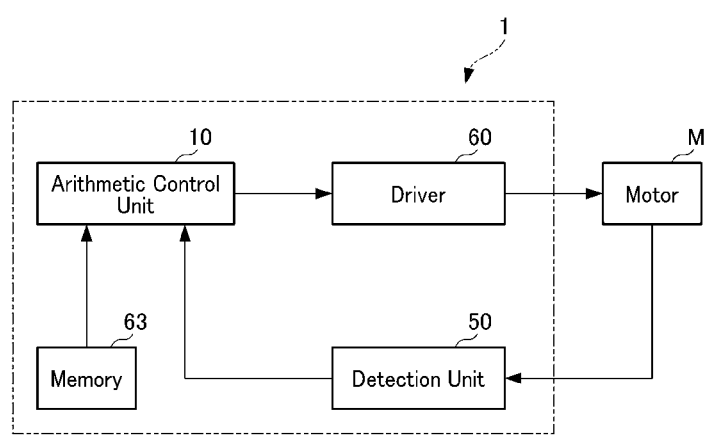
FIG. 1 is a diagram schematically showing a motor stop control apparatus according to a first embodiment of the present invention.

An exemplary example of the present invention will be described below with reference to the drawings. However, sizes, materials, shapes, and relative arrangements of elements described as examples or shown in the drawings are not limited to the content in which the scope of the present invention is described, which is merely illustrative examples. For example, expressions indicating a relative or absolute arrangement such as "in a certain direction," "following a certain direction," "parallel," "orthogonal," "center," "concentric," "coaxial," etc. represent not only strict arrangements but also states in which a tolerance is provided or relative displacement occurs with an angle and a distance with which the same functions are obtained. For example, expressions indicating that elements are in the same state such as "the same," "equal," or "homogeneous," represent not only strictly the same state but also a state in which a tolerance is provided or there is a difference with which the same functions are obtained. For example, an expression indicating a shape such as a rectangular shape or a cylindrical shape represents not only a shape such as a rectangular shape or a cylindrical shape in a geometrically strict sense, but also a shape including an uneven portion, a chamfered portion, or the like in a range in which the same effects are obtained. In addition, expressions that a component is "comprised," "included," "provided," "had," or "contained" are not exclusive expressions that exclude the presence of other components.

First Embodiment

First, a motor stop control apparatus configured to carry out a motor stop control method will be described before the motor stop control method according to an embodiment is described. Note that, in the embodiment, a case in which the motor stop control apparatus is applied to a radio control unit, a servo module product for a hobby robot, and the like will be described.

As shown in FIG. 1, a motor stop control apparatus 1 includes an arithmetic control unit 10 configured to control a motor M and a detection unit 50 capable of detecting a rotational state of the motor M. In the embodiment illustrated in FIG. 1, the motor stop control apparatus 1 further includes a driver 60 and a memory 63.

Figure 3:
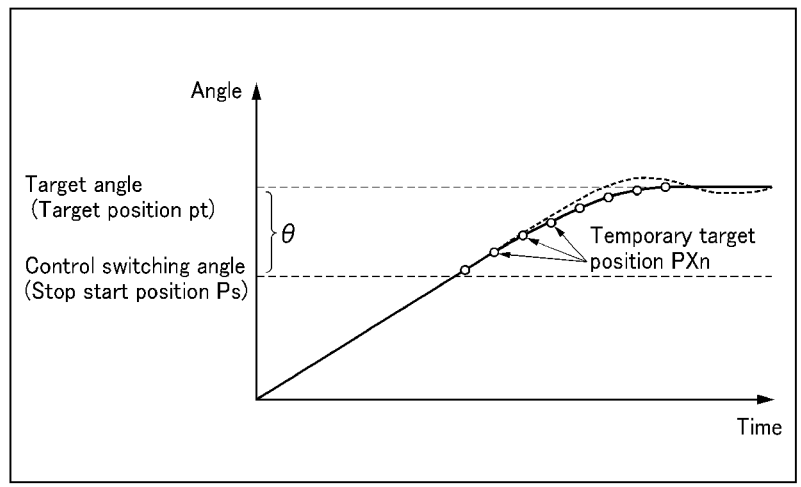
FIG. 3 is a graph for describing a relationship of an angle of a motor to an elapsed time during motor stop control.

As shown in FIG. 3, the arithmetic control unit 10 has a stop start position Ps at which stop control is started from a position which is a predetermined angle θ before a target position Pt at which the motor M stops. The stop start position Ps is a position in front of the target position Pt and a position in which the motor M can be stopped at the target position Pt when stop control of the motor M is performed from a position on the near side. The stop start position Ps is stored in the memory 63. Details of the stop start position Ps will be described below.

Figure 2:
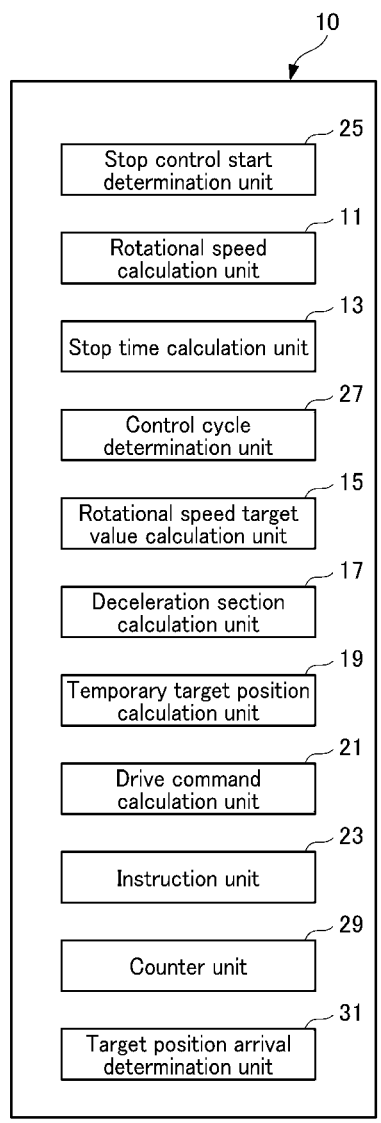
FIG. 2 is a diagram for describing an arithmetic control unit of the motor stop control apparatus.

As shown in FIG. 2, the arithmetic control unit 10 includes a rotational speed calculation unit 11 configured to calculate a rotational speed of the motor M at the stop start position Ps from a detection value detected by the detection unit 50 and a stop time calculation unit 13 configured to calculate a stop time until the rotational speed of the motor M reaches zero from the stop start position Ps on the basis of a deceleration line L0 representing a change in the rotational speed of the motor M, the rotational speed, and the predetermined angle. Furthermore, the arithmetic control unit 10 includes a rotational speed target value calculation unit 15 configured to calculate a rotational speed target value of the motor M every time the control cycle elapses on the basis of the stop time and a control cycle used to control the motor M and a deceleration section calculation unit 17 configured to calculate a deceleration section of the motor M by multiplying the calculated rotational speed target value by the control cycle. In addition, the arithmetic control unit 10 includes a temporary target position calculation unit 19 configured to calculate a temporary target position from a sum of the deceleration section and the stop start position Ps, a drive command calculation unit 21 configured to determine a current position of the motor M from a detection value detected by the detection unit 50 using the temporary target position as a control target value and to calculate a drive command from a difference between a current position of the motor M and the control target value, and an instruction unit 23 configured to output the drive command to the motor M.

In the embodiment illustrated in FIG. 2, the arithmetic control unit 10 further includes a stop control start determination unit 25, a control cycle determination unit 27, a counter unit 29, and a target position arrival determination unit 31.

The rotational speed calculation unit 11 calculates the rotational speed of the motor M at the stop start position Ps from the detection value detected by the detection unit 50 when a position of the motor M moves to the stop start position Ps. The calculation of the rotational speed of the motor M will be described below. Whether the position of the motor M has moved to the stop start position Ps is determined by the stop control start determination unit 25.

The detection unit 50 is a device capable of detecting the rotational state of the motor M. In the embodiment, the detection unit 50 is, for example, a potentiometer capable of detecting a rotational angle (a position) of the motor M. The potentiometer is a device configured to convert the rotational angle of the motor M into a voltage and can detect a rotational angle (a position) of the motor M from a voltage detected by the potentiometer. Furthermore, when the potentiometer detects the rotational speed of the motor M, the rotational speed of the motor M is detected on the basis of a rate of change of the voltage corresponding to a rate of change of the rotational angle (the position) of the motor M or speed information obtained by differentiating a signal of the potentiometer.

Figure 4:
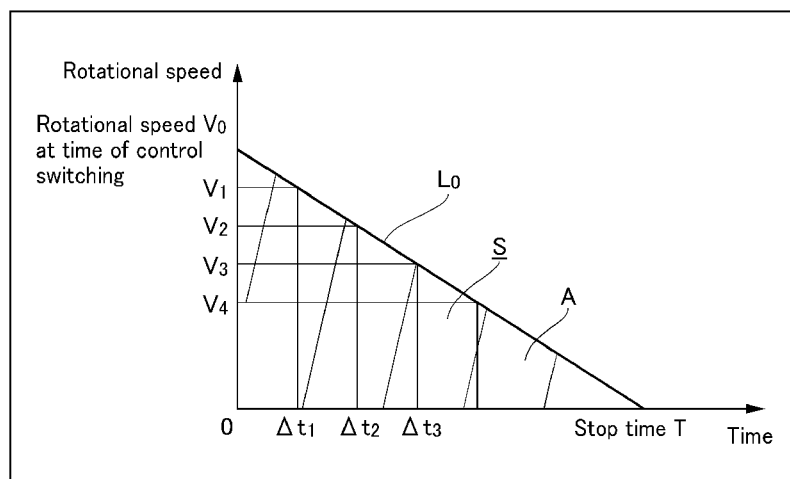
FIG. 4 is a graph for describing a method for calculating an arrival time at which a speed of the motor reaches zero.

The stop time calculation unit 13 calculates a stop time T until the rotational speed of the motor M reaches zero from the stop start position Ps when stop control of the motor M is started from the stop start position Ps. A method for calculating the stop time T will be described with reference to FIG. 4. A vertical axis of FIG. 4 represents a rotational speed V of the motor M and a horizontal axis of FIG. 4 represents time t. To be more specific, FIG. 4 illustrates a relationship between rotational speeds when stop control has started, that is, time t elapses from a rotational speed V0 at the time of control switching and the rotational speed V decreases to zero. In the embodiment, the deceleration line L0 at the rotational speed V is expressed by a linear function. Here, since an amount of movement due to the rotation of the motor M is a value obtained by multiplying the rotational speed of the motor M by time, in FIG. 4, an area A of a region S surround by the deceleration line L0, the vertical axis, and the horizontal axis and indicated by a diagonal line represents the amount of movement due to the rotation of the motor M. In other words, a value obtained by performing constant integration on the deceleration line L0 from a start point to an end point represents the amount of movement due to the rotation of the motor M. Here, the area A of the region S is obtained by subtracting the stop start position Ps from the target position Pt. Therefore, the area A is obtained as a predetermined angle θ.

In the embodiment, the stop time calculation unit 13 calculates the stop time T on the basis of the area A (the predetermined angle θ) and the rotational speed V0 at the time of control switching. For example, when the deceleration line L0 is a linear function, the stop time T is obtained by setting the stop time T=(area A/rotational speed V0 at the time of control switching)×2. Note that the deceleration line L0 is not limited to a line of a linear equation. The deceleration line L0 may be a line of quadratic equation or an equation of a greater order or a line obtained by combining a line of a linear equation and a line of a quadratic equation or an equation of a greater order. Therefore, the stop time calculation unit 13 calculates the stop time T on the basis of the area A (the predetermined angle θ) and the rotational speed V0 at the time of control switching in accordance with the deceleration line L0. In other words, the arithmetic control unit 10 calculates the stop time until the rotational speed of the motor reaches zero from the stop start position on the basis of the deceleration line L0 indicating a change in the rotational speed of the motor, the rotational speed V0, and the predetermined angle θ.

As shown in FIG. 2, the control cycle determination unit 27 determines whether an elapsed time Δt after the start of the stop control has exceeded the control cycle of the motor M. Here, since there are a plurality of control cycles of the motor M, the control cycle determination unit 27 determines whether the elapsed time has exceeded the control cycle for each control cycle of the motor M. When it is determined that the elapsed time has exceeded the control cycle of the motor M, the control cycle determination unit 27 transmits a signal corresponding to that fact to the rotational speed target value calculation unit 15.

The rotational speed target value calculation unit 15 calculates a rotational speed target value of the motor M every time the control cycle Δt elapses from the rotational speed V0, the stop time T, and a control cycle Δtn on the basis of the deceleration line L0. In the embodiment illustrated in FIG. 4, the deceleration line L0 is set to have a linear function and the rotational speed target value calculation unit 15 expresses the control cycle as Δtn. In this case, the rotational speed target value calculation unit 15 calculates a rotation target speed Vn of the motor M at Δtn by subtracting a value obtained by dividing the rotational speed V0 by the stop time T and multiplying the division result by the control cycle Δtn from the rotational speed V0. Moreover, the rotational speed target value calculation unit 15 ends the calculation of the speed when the rotational speed Vn calculated for each control cycle Δtn is substantially zero. The calculated rotational speeds V1 to Vn are stored in the memory 63.

The deceleration section calculation unit 17 sets a value calculated by multiplying the calculated rotational speed target value Vn−1 by the control cycle Δtn as a deceleration section Xn. For example, a deceleration section X1 is calculated using X1=V0×Δt1. For this reason, a general expression of the deceleration section Xn is calculated through the following Expression (1).

$$X_n = V_{n-1} \times \Delta t_n \quad (1)$$

The temporary target position calculation unit 19 calculates a temporary target position PXn from a sum of the deceleration section Xn and the stop start position Ps. For example, the temporary target position PX1 at Δt1 is calculated using a temporary target position PX1=Ps+X1. For this reason, a general expression of the temporary target position PXn is calculated through the following Expression (2). Thus, as shown in FIG. 3, the temporary target position PXn is provided for each control cycle from the stop start position Ps toward the target position Pt.

$$PX_n = Ps + \Sigma_{k=1}^{n} X_k \quad (2)$$

The drive command calculation unit 21 determines a current position of the motor M from a detection value detected by the detection unit 50 using the temporary target position PXn as a control target value and calculates a drive command from a difference between the current position of the motor M and the control target value. In the embodiment, the drive command calculation unit 21 performs proportional control in which an amount of operation in the drive command is adjusted to a value proportional to a magnitude of a difference between the current position and the control target value. Note that the drive command calculation unit 21 may perform PI control to which a proportional operation and an integral operation are added.

The instruction unit 23 outputs a drive command to the motor M. In the embodiment, the drive command output from the instruction unit 23 is output to the motor M via the driver 60. The driver 60 controls an amount of current flowing through the motor M, a direction, a timing, or the like on the basis of the drive command.

The counter unit 29 measures the number of iterations of the control cycle of the motor M. Details of operation content of the counter unit 29 will be described below. The target position arrival determination unit 31 determines whether the current position detected by the detection unit 50 has reached a target position.

Figure 5:
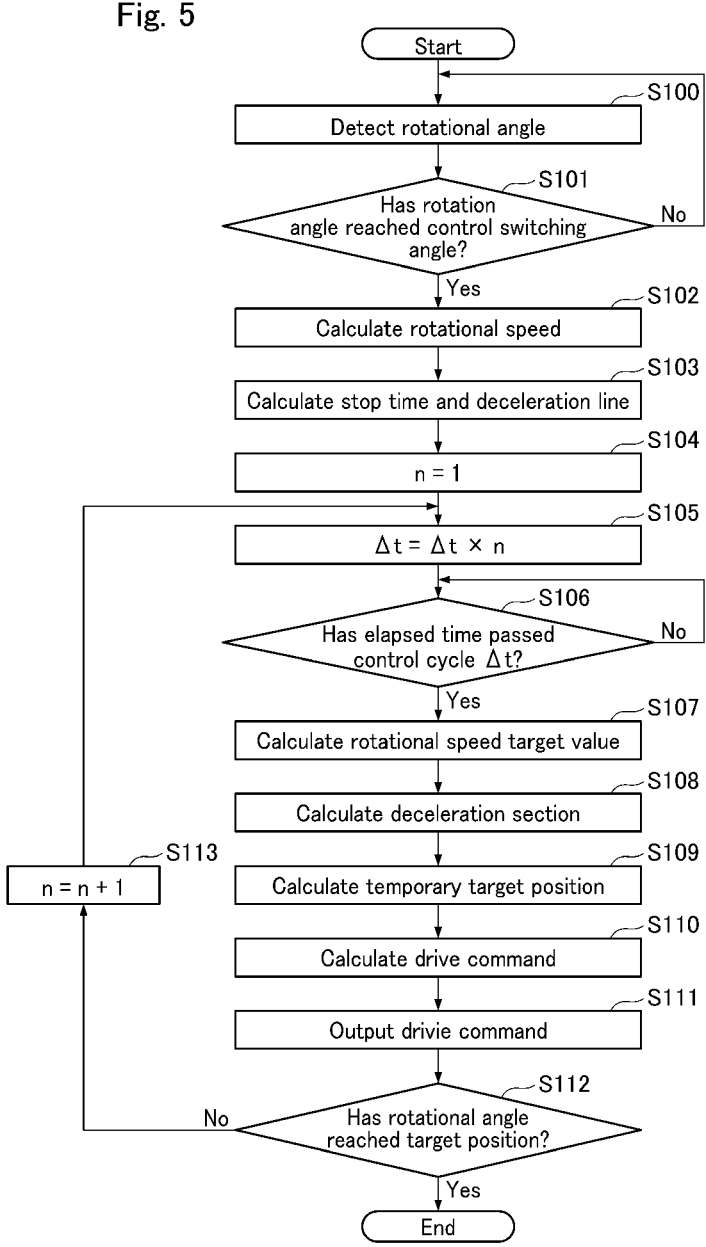
FIG. 5 is a flowchart for describing a motor stop control method according to the first embodiment of the present invention.
Figure 6:
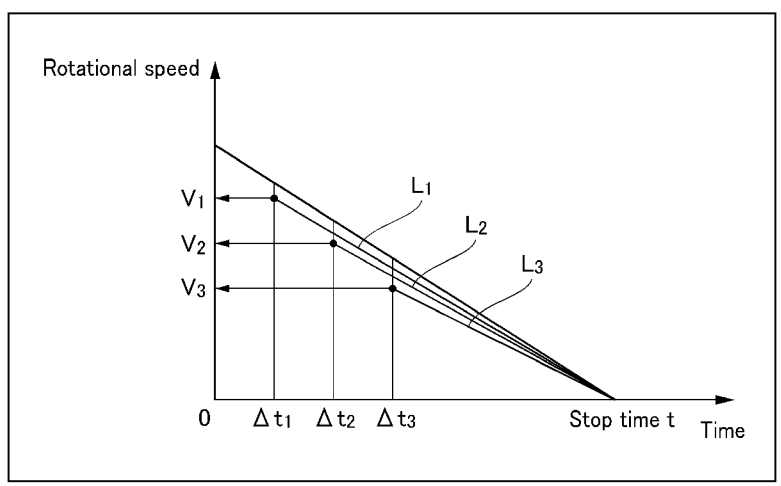
FIG. 6 is a diagram for describing a motor stop control method according to a second embodiment of the present invention.

An operation when stop control is performed on the motor M in the motor stop control apparatus 1 according to the embodiment will be described below with reference to FIGS. 2, 3, 5, and 6. First, as shown in FIG. 6, in Step (hereinafter Step is referred to as "S") 100, the detection unit 50 detects a rotational angle (a position) of the motor M. Moreover, in S101, the stop control start determination unit 25 determines whether the rotational angle of the motor M has reached a control switching angle of the motor M on the basis of the rotational angle (the position) of the motor M detected by the detection unit 50.

The motor stop control apparatus 1 moves to a process of S102 when it is determined that the rotational angle of the motor M has reached the control switching angle.

In S102, the rotational speed calculation unit 11 calculates the rotational speed V0 of the motor in the stop start position Ps from the detection value detected by the detection unit 50. The detected rotational speed is sent to the stop time calculation unit 13. Moreover, in S103, the stop time calculation unit 13 calculates the stop time T until the rotational speed of the motor M reaches zero from the stop start position Ps on the basis of the rotational speed V0 and the predetermined angle θ.

Also, in S104, the counter unit 29 sets the number of iterations n of the control cycle of the motor M to 1 serving as an initial value. Moreover, in S105, the counter unit 29 sets the control cycle Δt of the motor M as Δt×1.

In S106, the control cycle determination unit 27 determines whether an elapsed time from the start of the stop control of the motor M has passed the control cycle Δt of the motor.

The motor stop control apparatus 1 moves to a process of S107 when it is determined that the elapsed time from the start of the stop control of the motor M has passed the control cycle Δt of the motor. In S107, as shown in FIG. 4, the rotational speed target value calculation unit 15 calculates a rotational speed target value Vn of the motor M every time the control cycle elapses from the stop time and the control cycle used to control the motor M on the basis of the deceleration line L0. In the illustrated embodiment, the rotational speed target value calculation unit 15 calculates V1, V2, V3, V4, and the like.

In S108, the deceleration section calculation unit 17 calculates deceleration sections Xn of the motor M by multiplying the calculated rotational speed target value Vn by the control cycle Δtn. Moreover, in S109, the temporary target position calculation unit 19 calculates a temporary target position PXn from a sum of a total sum of the deceleration section Xn and the stop start position Ps. In S110, the drive command calculation unit 21 determines a current position of the motor M from the detection value detected by the detection unit 50 using the temporary target position PXn as a control target value and calculates a drive command from a difference between the current position of the motor M and the control target value. In S111, the instruction unit 23 outputs the drive command to the motor M. Therefore, the motor M moves from a control start position to the temporary target position PXn.

In S112, the target position arrival determination unit 31 determines whether the rotational angle detected by the detection unit 50 has reached a target angle. The target position arrival determination unit 31 determines that the motor M has reached the target position when it is determined that the rotational angle has reached the target angle.

As described above, the motor stop control apparatus 1 according to the embodiment calculates a rotational speed of the motor M at the stop start position Ps from the detection value detected by the detection unit 50 when the motor M moves to the stop start position Ps. Furthermore, the arithmetic control unit 10 calculates the rotational speed of the motor M for each control cycle of the motor M on the basis of the deceleration line L0. The arithmetic control unit 10 calculates a temporary target position for each control cycle on the basis of the rotational speed for each control cycle of the motor M. For this reason, in the motor stop control apparatus 1 according to the embodiment, stop control using position feedback is performed after the rotational speed at the stop start position Ps is detected. For this reason, the motor stop control apparatus 1 according to the embodiment can perform stop control without overrunning the target stop position no matter what the value of the rotation speed of the stop start position Ps is.

Also, in the motor stop control apparatus 1 according to the embodiment, the detection unit 50 is a potentiometer. For this reason, the detection unit 50 can detect a rotational state of the motor M. Here, the rotational state of the motor M may be a position (a rotational angle) of the motor M and a rotational speed of the motor M. In the embodiment, the potentiometer detects a position of the motor M. Furthermore, the arithmetic control unit 10 calculates a rotational speed of the motor M at the stop start position Ps from the detection value detected by the detection unit 50. For this reason, it is unnecessary to calculate a rotational speed of the motor M for each control cycle and to separately use a speed sensor. Furthermore, the motor stop control apparatus 1 according to the embodiment only needs to calculate a speed of the motor M at the stop start position Ps as compared to when a rotational speed of the motor M is calculated for each control cycle using a position detection value of a position sensor. Thus, the motor stop control apparatus 1 in which it is possible to minimize the possibility of increases in calculation load and calculation errors and the motor M can be stopped at a target position can be realized.

Also, in some embodiments, a predetermined angle θ may be larger than a short brake stop angle at which a rotational speed of the motor M is zero at the target position Pt such that the arithmetic control unit 10 brakes the motor M from a position before the target position Pt using a short brake.

Here, if terminals of the motor M are short-circuited while the motor M is rotating, an induced electromotive force generated while the motor M is rotating is shorted and a current flows through an armature winding. Since a direction of the current at this time is a direction opposite to a direction of the motor during the rotation, a braking force is applied to the motor M so that the stop time of the motor can be made faster. Such a braking force is a short brake.

Therefore, when a speed of the motor M at the target position Pt is likely to be unable to be set to zero even when the motor stop control apparatus 1 controls the rotation of the motor M, the speed of the motor M at the target position Pt can be surely be reduced to zero by operating the short brake on the motor M. Note that an operation of the short brake may be continuously performed within a predetermined time or may be operated a plurality of times. As described above, in some embodiments, it is possible to smoothly brake the motor before the target position Pt compared to the braking using the short brake by setting the predetermined angle θ larger than the short brake stop angle. For this reason, it is possible to prevent the motor from overrunning the target position.

Also, in some embodiments, the motor M may include a rotatable shaft, an output gear may be provided in the shaft, the detection unit 50 may include a position sensor, the position sensor may detect an angle of the output gear, and the rotational speed calculation unit 11 may calculate a rotational speed on the basis of the angle detected by the position sensor.

In this case, the output gear includes one or two or more gears. Torque of the motor can be increased by providing the output gear in the shaft. As described above, the position sensor is, for example, a potentiometer. The potentiometer detects a change in rotational angle as a change in resistance value. When a rotational speed of the motor is calculated from the detection value of such a potentiometer, for example, a rotational speed of the motor M may be calculated from a rate of change of a resistance value or a rotational speed can be calculated by differentiating a signal of the potentiometer.

As described above, in some embodiments, the position sensor may detect a position (an angle) of the output gear. In other words, the motor stop control apparatus 1 of the present disclosure is not limited to controlling a rotational angle of a rotor of the motor M and may control a rotational angle of the output gear attached to the shaft of the motor M.

Also, in some embodiments, the stop control method for the motor including the arithmetic control unit 10 configured to control the motor M and the detection unit 50 capable of detecting a rotational state of the motor M includes calculating, by the arithmetic control unit 10, a rotational speed of the motor M at a stop start position Ps at which stop control is started from a position which is a predetermined angle before a target position Pt at which the motor M stops from a detection value detected by the detection unit 50, a stop time calculation step of calculating, by the arithmetic control unit 10, a stop time until the rotational speed of the motor M reaches zero from the stop start position Ps on the basis of a deceleration line indicating a change in the rotational speed of the motor M, the rotational speed, and the predetermined angle, a rotational speed target value calculation step of calculating, by the arithmetic control unit 10, a rotational speed target value of the motor every time the control cycle elapses from a control cycle used to control the stop time and the motor on the basis of the deceleration line L0, a deceleration section calculation step of calculating, by the arithmetic control unit 10, a deceleration section of the motor M by multiplying the calculated rotational speed target value by the control cycle, a temporary target position calculation step of calculating, by the arithmetic control unit 10, a temporary target position from a sum of the deceleration section and the stop start position Ps, a drive command calculation step of determining, by the arithmetic control unit 10, a current position of the motor M from the detection value detected by the detection unit 50 using the temporary target position as a control target value and calculating a drive command using a difference between the current position of the motor M and the control target value, and an instruction step of outputting, by the arithmetic control unit 10, the drive command to the motor M.

The motor stop control method according to the embodiment is substantially the same as the operation of the motor stop control apparatus 1 described above. For this reason, with regard to the motor stop control method, differences from the operation of the motor stop control apparatus 1 will be described with reference to FIG. 5.

The rotational speed calculation step corresponds to the calculation of the rotational speed in S102 described with reference to FIG. 5. The stop time calculation step corresponds to the stop time in S103 described with reference to FIG. 5. The rotational speed target value calculation step corresponds to the calculation of the rotational speed target value in S107 described with reference to FIG. 5. The deceleration section calculation step corresponds to the calculation of the deceleration section in S108 described with reference to FIG. 5. The temporary target position calculation step corresponds to the calculation of the temporary target position in S109 described with reference to FIG. 5. The drive command calculation step corresponds to the calculation of the drive command in S110 described with reference to FIG. 5. The instruction step corresponds to the output of the drive command in S111 described with reference to FIG. 5.

As described above, the motor stop control method according to the embodiment calculates the rotational speed the motor M at the stop start position Ps from the detection value detected by the detection unit 50 when the motor M moves to the stop start position Ps. Furthermore, the rotational speed of the motor M for each control cycle of the motor M is calculated on the basis of the deceleration line L0 using the arithmetic control unit 10. In the other words, in the motor stop control method according to the embodiment, the stop control using a position feedback is performed after the rotational speed at the stop start position Ps is detected. For this reason, in the motor stop control method according to the embodiment, it is possible to perform stop control not to overrun the target stop position no matter what value the rotational speed at the stop start position Ps is.

Also, in some embodiments, the deceleration line L0 may be represented by a quadratic function in which a slope of the deceleration line L0 decreases as the deceleration line L0 approaches the stop time T.

By expressing a quadratic function in which the slope of the deceleration line L0 decreases as the deceleration line L0 approaches the stop time T, the rotational speed of the motor M can be further decreased as the position of the motor M approaches the stop time T than a case in which the deceleration line L0 is expressed using a linear function. For this reason, as indicated by a broken line in FIG. 3, it is possible to minimize a possibility of the motor M overshooting at a stop position.

Note that the deceleration line L0 may be represented by a linear function from the start of the stop control to a predetermined time and may be represented by the above-described quadratic function up to the stop time T beyond the predetermined time. In this way, the rotational speed of the motor M can be uniformly rapidly reduced along the deceleration line expressed by the linear function and the rotational speed of the motor M can be reduced in the vicinity of the stop position so that the motor M is accurately stopped at the stop position.

Also, in some embodiments, the detection unit 50 may be a position sensor capable of detecting a position of the motor M, and in a rotational speed detection step, a rotational speed can be calculated on the basis of a detection signal of the position sensor.

Since the method for calculating the rotational speed from the position sensor and the detection signal of the position sensor has already been described above, description thereof will be omitted. As described above, it becomes unnecessary to provide a speed detector configured to detect a rotational speed of the motor M for the purpose of calculating a rotational speed target value by making it possible to calculate the number of rotations of the motor M on the basis of the detection value of the position sensor. Furthermore, in a configuration in which a speed feedback is performed by differentiating a signal of the position sensor and using the signal as speed information, there is a possibility of a large calculation error due to differentiation. However, since only speed calculation at a predetermined stop start position Ps is performed in the embodiment, it is possible to minimize a possibility of large calculation load and calculation error.

Second Embodiment

A second embodiment of the present invention will be described below. In the second embodiment, differences from the above-described first embodiment will be described, constituent elements which are the same as those of the first embodiment will be denoted with the same reference numerals, and description thereof will be omitted.

FIG. 6 is a diagram for describing a motor stop control method according to the second embodiment of the present invention.

As shown in FIGS. 2 and 6, the motor stop control method according to the second embodiment and the motor stop control method according to the first embodiment differ in which the motor stop control method according to the second embodiment performs, by an arithmetic control unit 10, a deceleration line calculation step and a rotational speed target value calculation performed step on the basis of the calculated deceleration line. The motor stop control method according to the embodiment further includes a deceleration line calculation step of calculating, by the arithmetic control unit 10, a new stop time T1 until the motor stops at a target position Pu from a time at which a predetermined control cycle has elapsed from a stop start position Ps ($\Delta t1$, $\Delta t2$, $\Delta t3$, $\Delta t4$, . . . ). Moreover, in a rotational speed target value calculation step, a rotational speed target value of the motor every time the control cycle elapses is calculated from a rotational speed V1, the new stop time T1, and the control cycle of the motor at a time at which a predetermined control cycle has elapsed from the stop start position Pu.

As shown in FIG. 6, a detection unit 50 detects the position Pu of a motor M after the elapse of the control cycle $\Delta t$ ($\Delta t1$, $\Delta t2$, $\Delta t3$, $\Delta t4$, . . . ) from the stop start position Ps. Furthermore, a rotational speed calculation unit calculates the rotational speed V1 at the position Pu of the motor M. Moreover, in a deceleration line calculation step, the arithmetic control unit 10 calculates a stop time T1 from the position Pu of the motor M again at a time at which the control cycle $\Delta t$ has elapsed until the rotational speed of the motor M at a target position Pt reaches zero from the stop start position Ps. Here, the stop time is obtained by T1=2 (Pt−Ps)/V1. Moreover, similarly, like in the first embodiment, the arithmetic control unit 10 sequentially calculates a rotational target speed, deceleration interval calculation, and a temporary target position on the basis of the rotational speed V1 of the motor M, the stop time T1, and the control cycle $\Delta t$.

In the stop control of the motor M, an angle of the motor M approaches the target position Pt every time the control cycle of the motor M elapses. For this reason, a position and a rotational speed of the motor M changes for each control cycle. Therefore, there is a possibility of a difference generated from a rotational speed target value based on a motor rotational speed V0 calculated at the stop start position Pt. At this time, the stop control can be performed more accurately while a calculation load is minimized by calculating the rotational target speed, the deceleration interval calculation, and the temporary target position again.

Although the preferred embodiments of the present invention have been described above, the present invention is not limited to such embodiments, and various modifications and changes are possible within the scope of the gist of the present invention.

For example, although the method for calculating the stop time T has been described in a case in which the deceleration line L0 has adopted the linear function in the first embodiment, when the deceleration line L0 adopts a quadratic function or the like, a stop time calculation unit 13 calculates a stop time T on the basis of an area A (a predetermined angle θ) and a rotational speed V0 at the time of control switching.

For example, although the detection unit 50 is a potentiometer and detects a position (an angle) of the motor M in the first embodiment, the present invention is not limited thereto. The detection unit 50 may be a speed sensor such as an encoder. In this case, in a rotational speed calculation step, a rotational speed of the motor at the stop start position is calculated from the detection value detected by the encoder. In this case, the arithmetic control unit 10 may calculate a position of the motor M by integrating a detection value of the encoder. When such a method is compared with a control method for calculating a rotational speed of the motor M by differentiating position information of the position sensor for each control cycle, it is possible to reduce a calculation load and to prevent variations in information on a rotation speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A motor stop control method of a motor stop control apparatus including an arithmetic controller that controls a motor and a detector that detects a rotational state of the motor, the arithmetic controller having a control cycle which is a sampling interval used in detecting the rotational state of the motor at regular intervals and a stop start position at which a stop control is started from a position which is a predetermined angle before a target position at which the motor stops, the motor stop control method comprising:
   a rotational speed calculation step in which a rotational speed of the motor at the stop start position is calculated from a detection value detected by the detector;
   a stop time calculation step in which the arithmetic controller calculates a stop time until the rotational speed of the motor reaches zero from the stop start position, on the basis of a deceleration line indicating a change in the rotational speed of the motor, the rotational speed, and the predetermined angle;
   a rotational speed target value calculation step in which the arithmetic controller calculates a rotational speed target value of the motor;
   a deceleration section calculation step in which the arithmetic controller calculates a deceleration section value of the motor, by multiplying the calculated rotational speed target value by the control cycle;
   a temporary target position calculation step in which the arithmetic controller calculates a temporary target position, from a sum of the deceleration section and the stop start position;
   a drive command calculation step in which the arithmetic controller calculates a drive command on the basis of a difference between a current position of the motor and the control target value, after determining the current position of the motor from the detection value detected by the detector using the temporary target position as a control target value;
   an instruction step in which the arithmetic controller outputs the drive command to the motor;
   the method further comprising a deceleration line calculation step in which the arithmetic controller calculates a new stop time until the motor stops at the target position from a time at which a predetermined control cycle elapses from the stop start position; and
   in the rotational speed target value calculation step, the arithmetic controller calculates the rotational speed target value of the motor every time the control cycle elapses, on the basis of the rotational speed of the motor at a time at which the predetermined control cycle is elapsed from the stop start position, the new stop time, and the control cycle.

2. The motor stop control method according to claim 1, wherein the deceleration line is expressed by a quadratic function in which a slope of the deceleration line decreases as the deceleration line approaches the stop time.

3. The motor stop control method according to claim 1, wherein the predetermined angle is larger than a short brake stop angle at which a rotational speed of the motor is zero at the target position such that the arithmetic controller brakes the motor from a position before the target position using a short brake.

4. The motor stop control method according to claim 1, wherein the detector is a position sensor capable of detecting a position of the motor, and
   in the rotational speed calculation step, the arithmetic controller calculates the rotational speed on the basis of a detection signal of the position sensor.

5. A motor stop control apparatus comprising:
   an arithmetic controller that controls a motor; and
   a detector that detects a rotational state of the motor, wherein
   the arithmetic controller includes a control cycle which is a sampling interval used in detecting the rotational state of the motor at regular intervals and a stop start position at which a stop control is started from a position which is a predetermined angle before a target position at which the motor stops; and
   the motor stop control apparatus further includes:
     a rotational speed calculator that calculates a rotational speed of the motor at the stop start position from a detection value detected by the detector;
     a stop time calculator that calculates a stop time until the rotational speed of the motor reaches zero from the stop start position on the basis of the rotational speed and the predetermined angle;
     a rotational speed target value calculator that calculates a rotational speed target value of the motor every lime the control cycle elapses, from the rotational speed, the stop time, and a control cycle controlling the motor;

a deceleration section calculator that calculates a deceleration section value of the motor by multiplying the calculated rotational speed target value by the control cycle;

a temporary target position calculator that calculates a temporary target position from it sum of the deceleration section and the stop start position;

a drive command calculator that determines a current position of the motor from the detection value detected by the detector using the temporary target position as a control target value and calculates a drive command using a difference between the current position of the motor and the control target value;

an instructor that outputs the drive command to the motor;

the arithmetic controller calculates a new stop time until the motor stops at the target position from a time at which the control cycle elapses from the stop start position; and the arithmetic controller calculates the rotational speed target value of the motor every time the control cycle elapses, on the basis of the rotational speed of the motor at a time at which a predetermined control cycle is elapsed from the stop start position, the new stop time, and the control cycle.

6. The motor stop control apparatus according to claim 5, wherein the predetermined angle is larger than a short brake stop angle at which a rotational speed of the motor is zero at the target position such that the arithmetic controller brakes the motor from a position before the target position using a short brake.

7. The motor stop control apparatus according to claim 5, wherein the motor includes a rotatable shaft, the shaft includes an output gear, the detector includes a position sensor, the position sensor detects an angle of the output gear, and the rotational speed calculator calculates a rotational speed of the motor on the basis of the angle detected by the position sensor.

* * * * *